(12) United States Patent
Lee

(10) Patent No.: US 10,614,273 B2
(45) Date of Patent: Apr. 7, 2020

(54) SYSTEM AND METHOD FOR MANAGING TAG INFORMATION OF VEHICLE

(71) Applicants: Hyundai Motor Company, Seoul (KR); KIA Motors Corporation, Seoul (KR)

(72) Inventor: Sung Wook Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/170,611

(22) Filed: Oct. 25, 2018

(65) Prior Publication Data

US 2019/0325180 A1 Oct. 24, 2019

(30) Foreign Application Priority Data

Apr. 24, 2018 (KR) .................. 10-2018-0047135

(51) Int. Cl.
*G06K 7/00* (2006.01)
*G06K 7/10* (2006.01)
*G06K 19/07* (2006.01)

(52) U.S. Cl.
CPC ..... *G06K 7/10445* (2013.01); *G06K 19/0702* (2013.01); *G06K 19/0723* (2013.01)

(58) Field of Classification Search
CPC ....... G06Q 10/087; G06Q 40/00; G06Q 30/02

USPC ......................................................... 235/376
See application file for complete search history.

(56) References Cited

U.S. PATENT DOCUMENTS

| 6,259,056 | B1 * | 7/2001 | Cowden | G05B 19/4183 219/121.69 |
| 2007/0063029 | A1 * | 3/2007 | Brandt | G06Q 10/08 235/385 |
| 2015/0018999 | A1 * | 1/2015 | Lee | G05B 19/402 700/114 |
| 2015/0153732 | A1 * | 6/2015 | Scelsi | G05B 23/0205 29/430 |

* cited by examiner

*Primary Examiner* — Ahshik Kim
(74) *Attorney, Agent, or Firm* — Brinks Gilson & Lione

(57) ABSTRACT

A tag information management system for a vehicle may include: a smart tag attached to the vehicle transported by a conveyor on a production line and storing information of the vehicle; a scanner recognizing a body number of the vehicle entering the production line; a tag recognition device recognizing a wireless signal of the smart tag through an antenna disposed on the production line and sensing entry of the vehicle into the production line; and a server that stores information of the vehicle waiting for a production process, extracts the vehicle information corresponding to the body number recognized by a first scanner disposed in a tag attaching process, transmits the extracted information to the smart tag to store the transmitted information in the smart tag, and verifies whether the body number recognized by a second scanner disposed in a consistency verification process matches the vehicle information of the smart tag.

20 Claims, 5 Drawing Sheets

SYSTEM AND METHOD FOR MANAGING TAG INFORMATION OF VEHICLE

CROSS-REFERENCE TO RELATED APPLICATION

This application claims priority to and the benefit of Korean Patent Application No. 10-2018-0047135 filed on Apr. 24, 2018, the entire contents of which are incorporated herein by reference.

FIELD

The statements in this section merely provide background information related to the present disclosure and may not constitute prior art.

Disclosed herein is a system and a method for managing tag information of a vehicle.

BACKGROUND

Generally, a production line of a vehicle factory manages information of a vehicle being transferred to a conveyor in order, and manages an assembly process in consideration of the vehicle specification information that matches the vehicle information.

FIG. 1 shows a work management system or a production management system installed in a conventional production line of the vehicle.

Referring to FIG. 1, a manufacturing execution system (MES) manages sequence information of the vehicle that is sequentially mounted on a moving means installed on a conveyor. The vehicle is assembled as it is transported along the production line including processes through the conveyor.

A scanner reads a bar code attached to the vehicle body entering through the conveyor, recognizes the body number, and transmits the recognized body number to the facility terminal (or a facility device such as a programmable logic controller (PLC)).

The facility terminal inquires of the MES vehicle identification number (VIN) and specification information of the vehicle, and performs a process operation or a production process of the vehicle in consideration of the inquired VIN and specification information. Since various models and options of vehicles are assembled in the production line, parts to be applied to the vehicle may be changed or assembly of some parts may be added or omitted according to the specification information.

In the conventional art, the scanner may cause recognition error of the body number, and an error may occur in which the vehicle information stored in the facility terminal is mismatched with an actual vehicle. The errors may cause a case where production of the vehicle is disturbed.

For example, the recognition error may occur due to various reasons such as angle and scan time of the scanner and position of an operator of the system during scanning of the body number of the vehicle. When an error of the VIN information retrieved from the MES occurs, an error may occur in the production process due to the mismatch between the actual vehicle entering the process and the specification information.

This may lead to a difficulty with management of sequence information of the production line and a reduction in yield due to the line stop.

The above information disclosed in this Background section is only for enhancement of understanding and may contain information that does not form the prior art that is already known to a person of ordinary skill in the art.

SUMMARY

Disclosed herein is a system and a method for managing tag information of a vehicle that stores the vehicle information by attaching a smart tag to the vehicle inserted in a production line, and that verifies consistency between a body number of the vehicle recognized by a scanner and the vehicle information received from the smart tag recognized by wireless.

The system for managing tag information of the vehicle may include a smart tag that is attached to the vehicle transported by a conveyor on a production line of the vehicle and stores information of the vehicle; a scanner configured to recognize a body number of the vehicle entering the production line; a tag recognition device configured to recognize a wireless signal of the smart tag through an antenna disposed on the production line and to sense entry of the vehicle into a process area of the production line; and a server that stores information of the vehicle waiting for a production process of the production line in a database, extracts the vehicle information corresponding to the body number of the vehicle recognized by a first scanner that corresponds to the scanner and is disposed in a tag attaching process, transmits the extracted information to the smart tag to store the transmitted information in the smart tag, and verifies whether the body number of the vehicle recognized by a second scanner that corresponds to the scanner and is disposed in a consistency verification process matches the vehicle information stored in the smart tag.

The vehicle information may include a vehicle identification number and vehicle specification information.

The smart tag may include: a radio frequency identification device configured to transmit the wireless signal; a memory configured to store information of the vehicle to which the smart tag is attached; a battery configured to supply power for operation of the smart tag; and a control module that receives the vehicle information from the server to store the received information in the memory, extracts the vehicle information from the memory in order to verify consistency between the vehicle and the smart tag attached to the vehicle, and transmits the extracted information to the server.

When consistency verification performed in the consistency verification process is successful, the control module may change tag identification of the control module to a vehicle identification number of the vehicle.

When the tag recognition device identifies or confirms that identification information of the smart tag wirelessly connected to the tag recognition device is changed to a format of a vehicle identification number of the vehicle, the tag recognition device may determine that the smart tag is a tag succeeding consistency verification performed in the consistency verification process.

The server may include: a communicator configured to connect wireless communication with the smart tag sensed through the tag recognition device; a vehicle information management part configured to store the vehicle information received from the a manufacturing execution system device in the database; a position tracking part configured to track position information of the smart tag; and a controller configured to confirm position information and tag identification of the smart tag entering the tag attaching process to transmit the vehicle information to the smart tag when the controller receives the body number of the vehicle from the first scanner.

The position tracking part may store a coordinate system according to the conveyor travelling distance and may track the position information of the smart tag according to a moving distance of the conveyor from a start point where the vehicle is loaded.

The position tracking part may store a coordinate in which a plurality of antennas corresponding to the antenna are disposed and may track the position information of the smart tag using triangulation based on wireless signals received from the antennas.

The controller may inquire of the database a vehicle identification number corresponding to the body number of the vehicle recognized by the first scanner and may extract the vehicle information matched with the vehicle identification number from the database.

The controller may confirm the position information and the tag identification of the smart tag entering the consistency verification process to receive a vehicle identification number of the vehicle from the smart tag when the controller receives the body number of the vehicle information from the second scanner.

When the body number received from the second scanner matches the vehicle identification number received from the smart tag, the controller may determine that consistency verification performed in the consistency verification process is successful and may display the consistency verification result on a screen of the server.

When the body number received from the second scanner and the vehicle identification number received from the smart tag are mismatched, the controller may determine that consistency verification performed in the consistency verification process fails due to an error and may extract the vehicle information corresponding to the body number to store the extracted information in the smart tag again.

The controller may monitor the position information of the smart tag based on the tag identification that is verified that the vehicle body number matches the vehicle identification number, and the controller may recognize entry of the vehicle into the production process and may confirm the vehicle information based on the monitoring result.

A method for managing tag information of the vehicle in which a server installed in a production line of the vehicle manages information of a smart tag attached to the vehicle may include a) receiving, by a controller of the server, information of the vehicle waiting for a production process of the production line from a manufacturing execution system device to store the received information in a database of the server; b) transporting, by a conveyor of the production line, the vehicle; c) extracting, by the controller, the vehicle information corresponding to a body number of the vehicle recognized by a first scanner of a tag attaching process and transmitting the extracted information to the smart tag attached to the vehicle to store the transmitted information in the smart tag; and d) verifying, by the controller, whether the body number of the vehicle recognized by a second scanner of a consistency verification process matches the vehicle information stored in the smart tag.

Step c) may include: inquiring, by the controller, of the database a vehicle identification number corresponding to the body number of the vehicle and extracts the vehicle information matched with the vehicle identification number from the database.

Step d) may include: confirming, by the controller, position information and tag identification of the smart tag entering the consistency verification process to receive a vehicle identification number of the vehicle information from the smart tag.

Step d) may further include: determining, by the controller, that consistency verification performed in the consistency verification process is successful when the body number received from the second scanner matches the vehicle identification number received from the smart tag.

Step d) may further include: determining, by the controller, that consistency verification performed in the consistency verification process fails when the body number received from the second scanner and the vehicle identification number received from the smart tag are mismatched; and extracting, by the controller, the vehicle information corresponding to the body number to store the extracted information in the smart tag again.

The method for managing tag information of the vehicle may further include: after step d), transmitting, by the controller, a success result of consistency verification performed in the consistency verification process to the smart tag to change tag identification of the smart tag to a vehicle identification number of the vehicle.

The method for managing tag information of the vehicle may further include: after step d), monitoring, by the controller, position information of the smart tag based on the tag identification changed to the vehicle identification number to recognize entry of the vehicle into the production process and grasp the vehicle information based on the monitoring result.

Vehicle information may be stored in the smart tag attached to the vehicle and may confirm consistency between the body number of the vehicle recognized by the scanner and the vehicle identification number received from the smart tag. Thus, consistency between the smart tag information attached to an actual vehicle and the actual vehicle may be provided.

An error in the production process due to a mismatch between the vehicle inserted in the production process and the specification information of the vehicle may be prevented or inhibited by providing consistency between the actual vehicle and the smart tag information.

Further, a scanner facility may not be included, and entry of the vehicle into the production process may be recognized by monitoring position information of the vehicle inserted into the production process based on integrated tag identification (ID) which is verified that the vehicle body number of the ID matches the vehicle identification number thereof.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
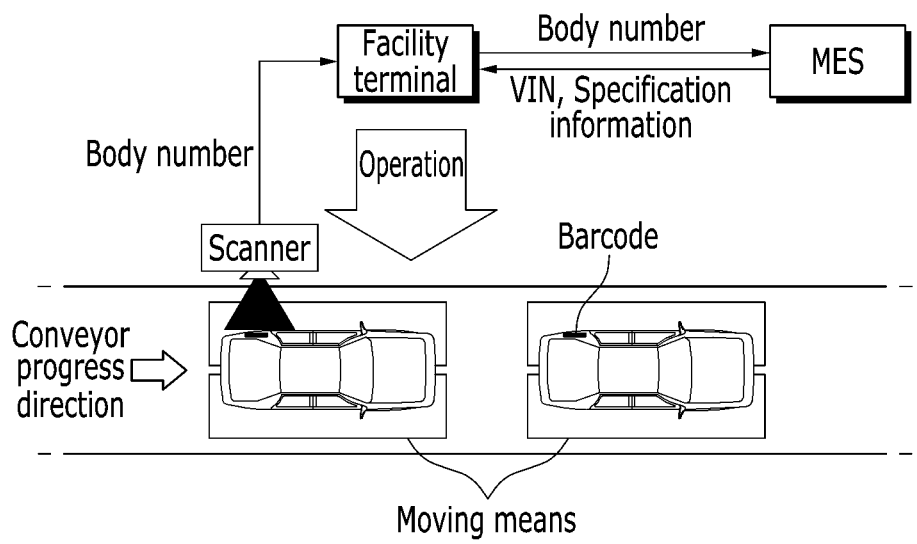
FIG. 1 shows a work management system or a production management system installed in a conventional production line of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Throughout the specification, a vehicle includes not only a finished vehicle but also a vehicle body (e.g., a body in white) being assembled in a production line of the vehicle, and a fact that the vehicle is moved means that it is not moved by itself but it is moved by a moving means such as a conveyor.

A tag information management system and method for the vehicle will now be described in detail with reference to the drawings.

Figure 2:
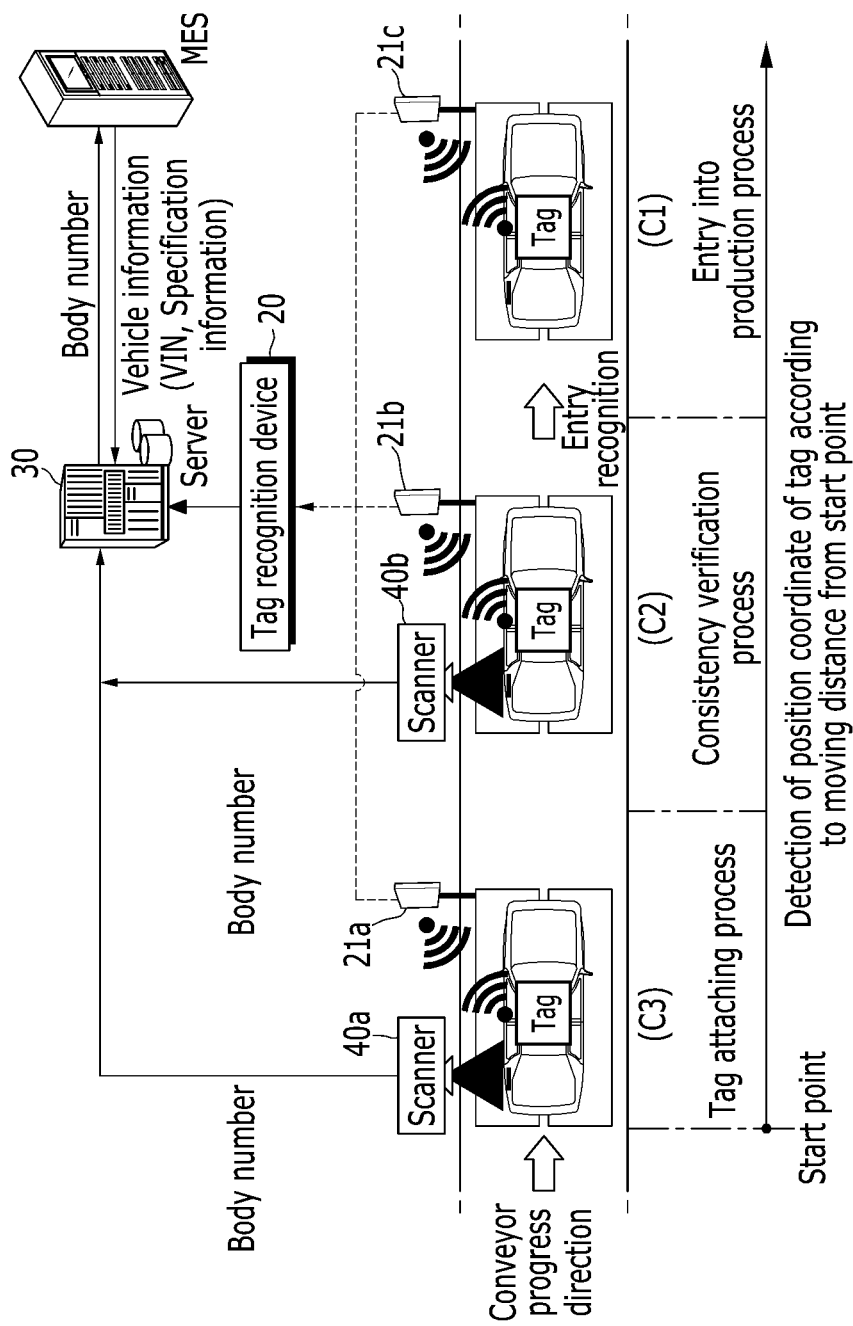
FIG. 2 schematically shows a configuration of a system for managing tag information of a vehicle.

FIG. 2 schematically shows a configuration of the tag information management system for the vehicle.

Referring to FIG. 2, the tag information management system may include a smart tag 10, a tag recognition device 20, a server 30, and a scanner 40. The tag information management system may further include a manufacturing execution system (MES) (or an MES device) 30 that is linked to the server 30 and is disposed in the vehicle factory.

FIG. 2 shows the tag information management of the vehicle in which a consistency verification process between the vehicle and the tag is performed after a tag attaching process for the vehicle entering into a conveyor progress direction is performed. In FIG. 2, entry of the vehicle into a production process shows a state in which entry of the vehicle into the process is recognized through a wireless connection with the inserted vehicle due to the verification success without the scanner.

In the tag attaching process, the server 30 may extract vehicle information corresponding to a body number VIN_1 of the vehicle recognized by a first scanner 40a in a database of the server and may transmit the extracted vehicle information to the smart tag 10 attached to the vehicle via wireless communication. For example, the first scanner may read a bar code attached to the vehicle body to recognize the body number.

The vehicle information may be information received from the MES and stored in the server 30 and may include a vehicle identification number VIN_2 and specification information. The body number VIN_1 and the vehicle identification number VIN_2 may be a same vehicle identification number VIN or a code associated with a same vehicle. The specification information may mean information for distinguishing an option (e.g., a vehicle model (or a vehicle type), a convenience device according to a vehicle type, a vehicle for domestic market, a vehicle for export market, and a sales area of a vehicle) applied to the production process of the vehicle.

In the consistency verification process, the server 30 may reconfirm or verify consistency between the vehicle number VIN_1 of the vehicle recognized by a second scanner 40b and the vehicle identification number VIN_2 stored in the smart tag 10 attached to the vehicle. For example, the second scanner may read the bar code attached to the vehicle body to recognize the body number.

The scanner 40 may be installed at an entrance of each process and may include at least one of an auto scanner and a handy scanner. The scanner 40 may read the body number attached to the vehicle (or the vehicle body) entering the process through the conveyor and may transmit the read body number to the server 30. The scanner 40 may be interlocked with a communicable computer.

The smart tag 10 may be attached to bodies of a first vehicle C1, a second vehicle C2, and a third vehicle C3 in order in which the first vehicle, the second vehicle, and the third vehicle are loaded on the conveyor of the production line on which the vehicles are assembled.

The smart tag 10 may connect wireless communication with the server 30 via the antenna 21.

The smart tag 10 may receive information of the vehicle to which it is attached from the server 30 via wireless communication and may store the received information.

The smart tag 10 may be used as a unique identifier of the vehicle that identifies position of the vehicle after it is attached to the vehicle, and may transmit tag identification (ID) in order to connect wireless communication with a nearby antenna 21 during movement of the vehicle.

Figure 3:
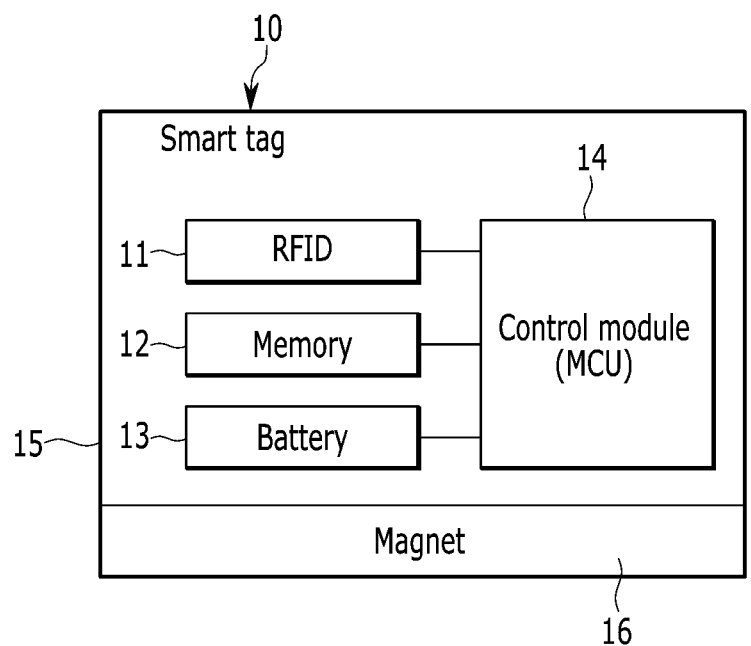
FIG. 3 is a block diagram schematically showing a configuration of a smart tag.

FIG. 3 is a block diagram schematically showing a configuration of the smart tag.

Referring to FIG. 3, the smart tag 10 includes a radio frequency identification (RFID) (or an RFID device) 11, a memory 12, a battery 13, and a control module (or a control device) 14. The smart tag 10 may be attached to the vehicle body by a magnet 16 formed on a surface of a housing 15.

The RFID 11 may include an active device powered by a battery 13 and may function as a communication module for transmitting data through the tag ID.

The memory 12 may store vehicle information of the vehicle to which the smart tag 10 is attached.

The memory 12 may store the vehicle information including the vehicle identification number VIN_2 and the specification information which are inquired by the server 30 using the body number VIN_1 read through a barcode scanner 40.

The battery 13 may supply power for operation of the smart tag 10.

The control module 14 includes a micro controller unit (MCU) having an algorithm for performing an overall control of the smart tag 10.

In the tag attaching process, the control module 14 may transmit a radio signal through the RFID 11 to connect communication with the server 30 via the antenna 21 and may receive the vehicle information from the server 30 to store the received information.

In the consistency verification process, the control module 14 may extract the vehicle information from the memory and may transmit the extracted information to the server 30 in order to verify the consistency between the vehicle and the smart tag 10 attached to the vehicle.

When the consistency verification is successful, the control module 14 may extract the VIN_2 from the vehicle information and may change the extracted VIN_2 to its own tag ID (VIN).

That is, the smart tag 10 completing the consistency verification may modify its tag ID to the VIN_2 of the vehicle to store the modified tag ID for identification of the vehicle. The modified tag ID may be used as integrated identification information of the smart tag and the vehicle. Therefore, in the following description, the tag ID stored before the consistency verification is performed may be referred to as a tag ID and the tag ID after the consistency verification succeeds may be referred to a tag ID (VIN).

Thereafter, when the process of the vehicle is completed and the smart tag is released from the vehicle, the tag ID (VIN) may be reset to an original tag ID.

The tag recognition device 20 may manage installation positions and identifications (IDs) of the plurality of antennas 21a, 21b and 21c disposed in a longitudinal direction of the production line, and may recognize a wireless signal of the smart tag 10 through the installation positions and the IDs to detect entry of the vehicle into process areas of the production line.

The tag recognition device 20 may recognize or detect an actual vehicle entering each process area where the antenna 21 is installed and actual sequence information of the vehicle by recognizing the smart tags 10 sequentially transferred through the conveyor.

The tag recognition device 20 may check or confirm identification information of the smart tag 10 wirelessly connected to the tag recognition device so that it determines that it is initially connected to the smart tag when it is communicated with the tag ID and it determines that the smart tag succeeds the consistency verification when it is communicated with the tag ID (VIN).

The server 30 may be a middleware that is linked to the MES and may be included in the process facility.

The server 30 may verify whether the vehicle information before the vehicle is inserted in the production process matches the vehicle information stored in the smart tag 10 attached to the vehicle and then may monitor a movement state of the smart tag.

Figure 4:
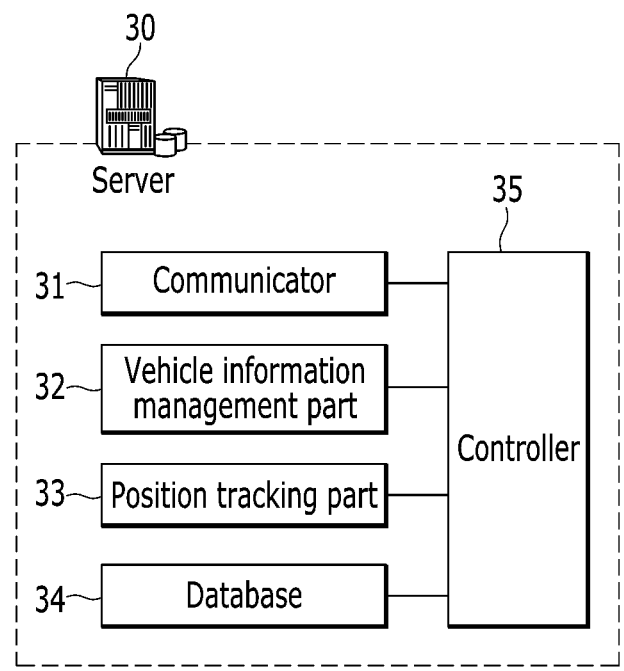
FIG. 4 is a block diagram schematically showing a configuration of a server.

FIG. 4 is a block diagram schematically showing a configuration of the server.

Referring to FIG. 4, the server 30 includes a communicator 31, a vehicle information management part 32, a position tracking part 33, a database (DB) 34, and a controller 35.

The communicator 31 may connect wireless communication with the smart tag 10 sensed through the tag recognition device 20.

The vehicle information management part 32 may store the vehicle information received from the MES in the database 34. The vehicle information management part 32 may update the tag IDs of the smart tags 10 sequentially attached to the vehicle loaded at a predetermined interval at a start point of the conveyor by matching the tag ID with the vehicle information.

Referring to FIG. 1, the position tracking part 33 may store a coordinate system according to the conveyor progress direction, and may detect position information (e.g., a coordinate) of the smart tag according to a moving distance of the conveyor from the start point where the vehicle is loaded. The vehicle may be moved in one direction along the conveyor installed along the production line so that the position tracking part 33 tracks the position of the vehicle based on the moving distance (i.e., a traveling distance of the conveyor) from the start point where the vehicle is loaded.

The position tracking part 33 may store a coordinate in which the plurality of antennas 21 are disposed and may track the position information of the smart tag 10 using triangulation based on wireless signals received from the plurality of antennas.

The database 34 may store various programs and data for the tag information management of the vehicle, and may store data generated according to operations of the programs and the data.

The database 34 may store the vehicle information received from the MES, and may match the received information with information of the vehicle to which the smart tag 10 is attached to store the matched information.

The controller 35 may be a central processing unit (CPU) and may control an overall operation of parts of the server for managing the tag information of the vehicle on the production line.

Hereinafter, the method of managing the tag information of the vehicle through the consistency verification algorithm for providing consistency between the actual vehicle and the tag information will be described in detail with reference to FIG. 5.

Figure 5:
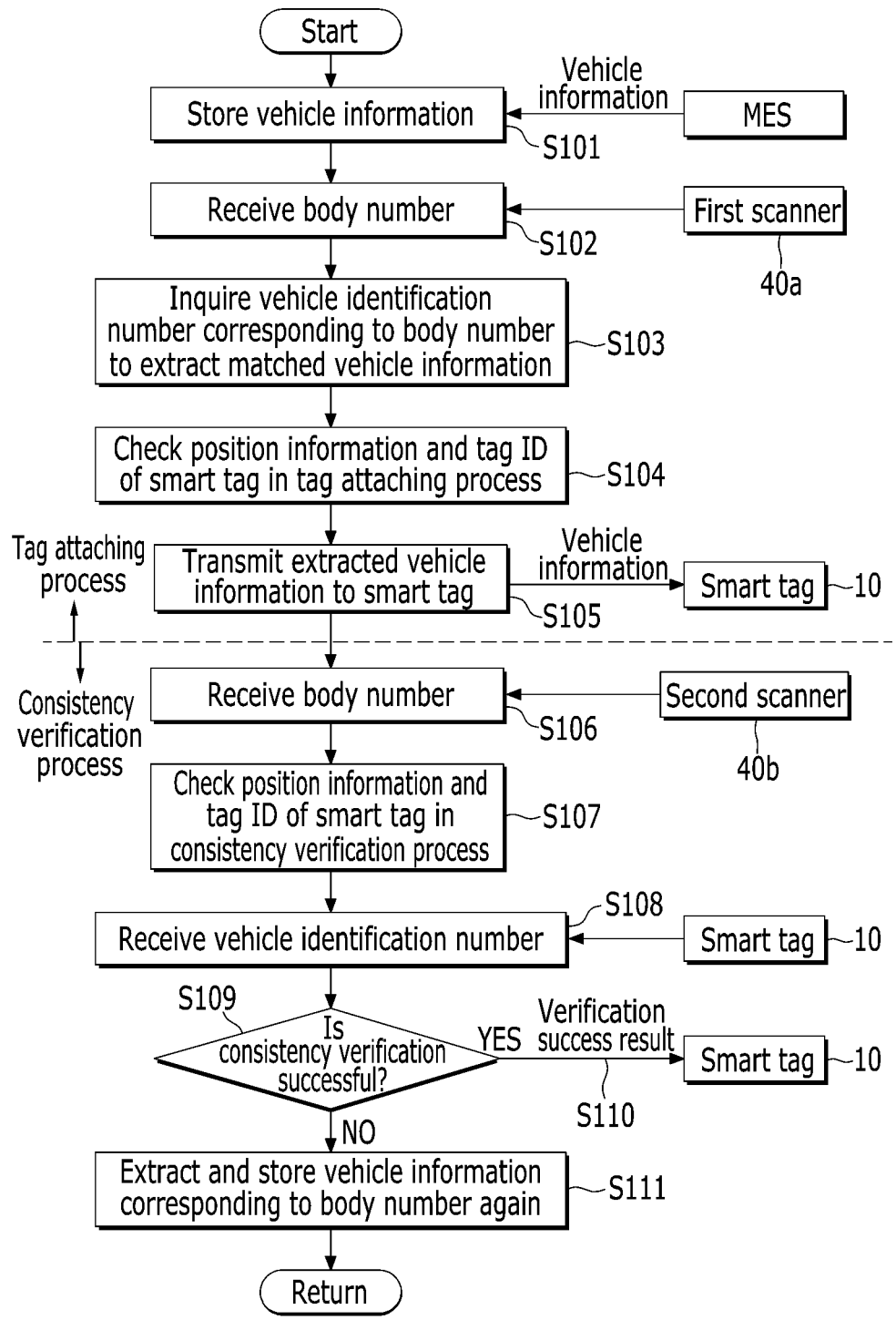
FIG. 5 is a flowchart illustrating a method of managing the tag information of the vehicle.

FIG. 5 is a flowchart illustrating the method of managing the tag information of the vehicle.

Referring to FIG. 5, the vehicle may be sequentially loaded on the conveyor at the start point of the production line, and the smart tag 10 may be attached to the sequentially loaded vehicle and may start operation.

The controller 35 may receive information (e.g., the VIN, the specification information, and the sequence information) of the vehicle waiting for the production process from the MES and may store the received information in the DB 34 (step S101).

The controller 35 may receive the body number VIN_1 of the vehicle entering the tag attaching process from the first scanner 40a (step S102).

The controller 35 may inquire of the DB 34 the vehicle identification number VIN_2 corresponding to the body number VIN_1 and may extract the vehicle information matched with the VIN_2 from the DB 34 (step S103).

The controller 35 may check or confirm the position information and the tag ID of the smart tag 10 entering the tag attaching process (step S104), and may transmit the extracted vehicle information to the smart tag 10 (step S105). The extracted vehicle information may be stored in the smart tag 10. The controller 35 may grasp the position information of the smart tag 10 through the position tracking part 33, and may determine that the smart tag is an initially connected tag before the tag ID is changed to the VIN format.

The tag attaching process has been described above, and the consistency verification process will be described below.

The controller 35 may receive the body number VIN_1 of the vehicle entering into the consistency verification process from the second scanner 40b (step S106).

The controller may confirm the position information and the tag ID of the smart tag 10 entering the consistency verification process (step S107) and may receive the stored vehicle identification number VIN_2 from the smart tag (step S108).

When the body number VIN_1 received from the second scanner 40b matches the vehicle identification number VIN_2 received from the smart tag 10, the controller 35 may determine that the verification is successful (Yes in step S109). The controller 35 may display the verification result on a screen of the server 30 and may transmit the verification result to the smart tag 10 (step S110). For example, the screen may be a screen of a display device included in the server 30.

The smart tag 10 may change the vehicle identification number VIN_2 according to a success of the consistency verification to its own tag ID (VIN). The tag ID (VIN) may be utilized as integrated identification information of the vehicle and the smart tag 10.

When the body number VIN_1 and the vehicle identification number VIN_2 are mismatched, the controller 35 may determine that the consistency verification has failed due to an error (No in step S109), and may extract the vehicle information corresponding to the body number VIN_1 to store the extracted information again in the smart tag 10 (step S111).

The extracted information may be stored again by reloading the vehicle to the start point to perform the tag attaching process again or by the system operator's direct re-inputting the vehicle information to the smart tag 10. The operator may be a worker of the system.

After the consistency verification process, the controller 35 may monitor the position information of the smart tag 10 based on the tag ID (VIN), may recognize the entry of the vehicle into the production process and may confirm the vehicle information based on the monitoring result.

Therefore, each process for confirming entry of a vehicle and the vehicle information using a scanner according to a conventional art may be omitted.

As described above, vehicle information may be stored in the smart tag attached to the vehicle and may confirm consistency between the body number of the vehicle recognized by the scanner and the vehicle identification number received from the smart tag. Thus, consistency between the smart tag information attached to the actual vehicle and the actual vehicle may be provided.

The system or method may prevent or inhibit an error in the production process due to a mismatch between the vehicle inserted in the production process and the specification information of the vehicle by providing consistency between the actual vehicle and the smart tag information.

Further, the system or method may omit scanner facility and may recognize entry of the vehicle into the production process by monitoring position information of the vehicle inserted into the production process based on the integrated tag identification (ID) which is verified that the vehicle body number of the ID matches the vehicle identification number thereof.

The system and/or method as disclosed herein may be implemented by a program, executable by a CPU, for operating a function corresponding to the present disclosure, a recording medium in which the program is recorded, and the like, and the implementation may be realized from the description of the present disclosure by those skilled in the art.

It is to be understood that the present disclosure is not limited, but, on the contrary, is intended to cover various modifications and equivalent arrangements included within the spirit and scope of the appended claims.

| <Description of symbols> | |
|---|---|
| 10: smart tag | 11: RFID |
| 12: memory | 13: battery |
| 14: control module | 15: housing |
| 16: magnet | 20: tag recognition device |

| <Description of symbols> | |
|---|---|
| 21: antenna | 30: server |
| 31: communicator | 32: vehicle information management part |
| 33: position tracking part | 34: database |
| 35: controller | |

What is claimed is:

1. A system for managing tag information of a vehicle, comprising:
a smart tag that is attached to the vehicle transported by a conveyor on a production line of the vehicle and stores information of the vehicle;
a first scanner configured to recognize a body number of the vehicle entering the production line;
a tag recognition device configured to recognize a wireless signal of the smart tag through an antenna disposed on the production line and to sense entry of the vehicle into a process area of the production line; and
a server comprising:
a memory configured to store information of the vehicle waiting for a production process of the production line, and
a processor in communication with the memory, the processor configured to:
extract the vehicle information corresponding to the body number of the vehicle recognized by the first scanner, the first scanner being disposed at a first position of the conveyer, the first position being associated with attaching the smart tag to the vehicle,
transmit the extracted information to the smart tag to store the transmitted information in the smart tag, and
verify whether the body number of the vehicle recognized by a second scanner matches the vehicle information stored in the smart tag, the second scanner being disposed at a second position of the conveyer.

2. The system of claim 1, wherein the vehicle information includes a vehicle identification number and vehicle specification information.

3. The system of claim 1, wherein the smart tag comprises:
a radio frequency identification device configured to transmit the wireless signal;
a memory configured to store information of the vehicle to which the smart tag is attached;
a battery configured to supply power for operation of the smart tag; and
a controller configured to:
receive the vehicle information from the server;
store the received information in the memory;
extracts the vehicle information from the memory and verify consistency between the vehicle and the smart tag attached to the vehicle; and
transmit the extracted information to the server.

4. The system of claim 3, wherein when consistency verification performed in the consistency verification process is successful, the controller is configured to change tag identification of the controller to a vehicle identification number of the vehicle.

5. The system of claim 1, wherein when the tag recognition device confirms that identification information of the smart tag wirelessly connected to the tag recognition device is changed to a format of a vehicle identification number of the vehicle, the tag recognition device is configured to determine that the smart tag is a tag succeeding consistency verification performed in the consistency verification process.

6. The system of claim 1, wherein the server further comprises:
a communicator configured to connect wireless communication with the smart tag sensed through the tag recognition device;
a vehicle information management part configured to store the vehicle information received from a manufacturing execution system device in a database; and
a position tracking part configured to track position information of the smart tag;
wherein the processor is further configured to:
confirm position information and tag identification of the smart tag entering the tag attaching process; and
transmit the vehicle information to the smart tag when the processor receives the body number of the vehicle from the first scanner.

7. The system of claim 6, wherein the position tracking part stores a coordinate system according to the conveyor travelling distance and tracks the position information of the smart tag according to a moving distance of the conveyor from a start point where the vehicle is loaded.

8. The system of claim 6, wherein the position tracking part stores a coordinate in which a plurality of antennas corresponding to the antenna are disposed and tracks the position information of the smart tag using triangulation based on wireless signals received from the antennas.

9. The system of claim 6, wherein the processor is configured to search the database for a vehicle identification number corresponding to the body number of the vehicle recognized by the first scanner and to extract the vehicle information matched with the vehicle identification number from the database.

10. The system of claim 6, wherein the processor is configured to confirm the position information and the tag identification of the smart tag entering the consistency verification process and to receive a vehicle identification number of the vehicle from the smart tag when the controller receives the body number of the vehicle information from the second scanner.

11. The system of claim 10, wherein when the body number received from the second scanner matches the vehicle identification number received from the smart tag, the processor is configured to determine that consistency verification performed in the consistency verification process is successful and to display a consistency verification result on a screen of the server.

12. The system of claim 10, wherein when the body number received from the second scanner and the vehicle identification number received from the smart tag are mismatched, the processor is configured to:
determine that consistency verification performed in the consistency verification process fails due to an error;
extract the vehicle information corresponding to the body number; and
store the extracted information in the smart tag again.

13. The system of claim 10, wherein the processor is configured to:
monitor the position information of the smart tag based on the tag identification that is verified that the vehicle body number matches the vehicle identification number, and recognize entry of the vehicle into the production process and confirms the vehicle information based on a monitoring result.

14. A method for managing tag information of a vehicle in which a server installed in a production line of the vehicle manages information of a smart tag attached to the vehicle, comprising:
a) receiving, by a controller of the server, information of the vehicle waiting for a production process of the production line from a manufacturing execution system device to store the received information in a database of the server;
b) transporting, by a conveyor of the production line, the vehicle;
c) extracting, by the controller, the vehicle information corresponding to a body number of the vehicle recognized by a first scanner in a tag attaching process and transmitting the extracted information through a tad recognition device to the smart tag attached to the vehicle to store the transmitted information in the smart tag; and
d) verifying, by the controller, whether the body number of the vehicle recognized by a second scanner of a consistency verification process matches the vehicle information stored in the smart tag.

15. The method of claim 14, wherein step c) comprises:
inquiring, by the controller, of the database a vehicle identification number corresponding to the body number of the vehicle and extracts the vehicle information matched with the vehicle identification number from the database.

16. The method of claim 14, wherein step d) comprises:
confirming, by the controller, position information and tag identification of the smart tag entering the consistency verification process to receive a vehicle identification number of the vehicle information from the smart tag.

17. The method of claim 16, wherein step d) further comprises:
determining, by the controller, that consistency verification performed in the consistency verification process is successful when the body number received from the second scanner matches the vehicle identification number received from the smart tag.

18. The method of claim 16, wherein step d) further comprises:
determining, by the controller, that consistency verification performed in the consistency verification process fails when the body number received from the second scanner and the vehicle identification number received from the smart tag are mismatched; and
extracting, by the controller, the vehicle information corresponding to the body number to store the extracted information in the smart tag again.

19. The method of claim 14, further comprising:
after step d), transmitting, by the controller, a success result of consistency verification performed in the consistency verification process to the smart tag to change tag identification of the smart tag to a vehicle identification number of the vehicle.

20. The method of claim 19, further comprising:
after step d), monitoring, by the controller, position information of the smart tag based on the tag identification changed to the vehicle identification number to recognize entry of the vehicle into the production process and grasp the vehicle information based on the monitoring result.

* * * * *